Oct. 7, 1969
J. C. LITTMANN
3,471,765
SEAT ADJUSTER CIRCUIT CONTROL
Filed Feb. 15, 1965
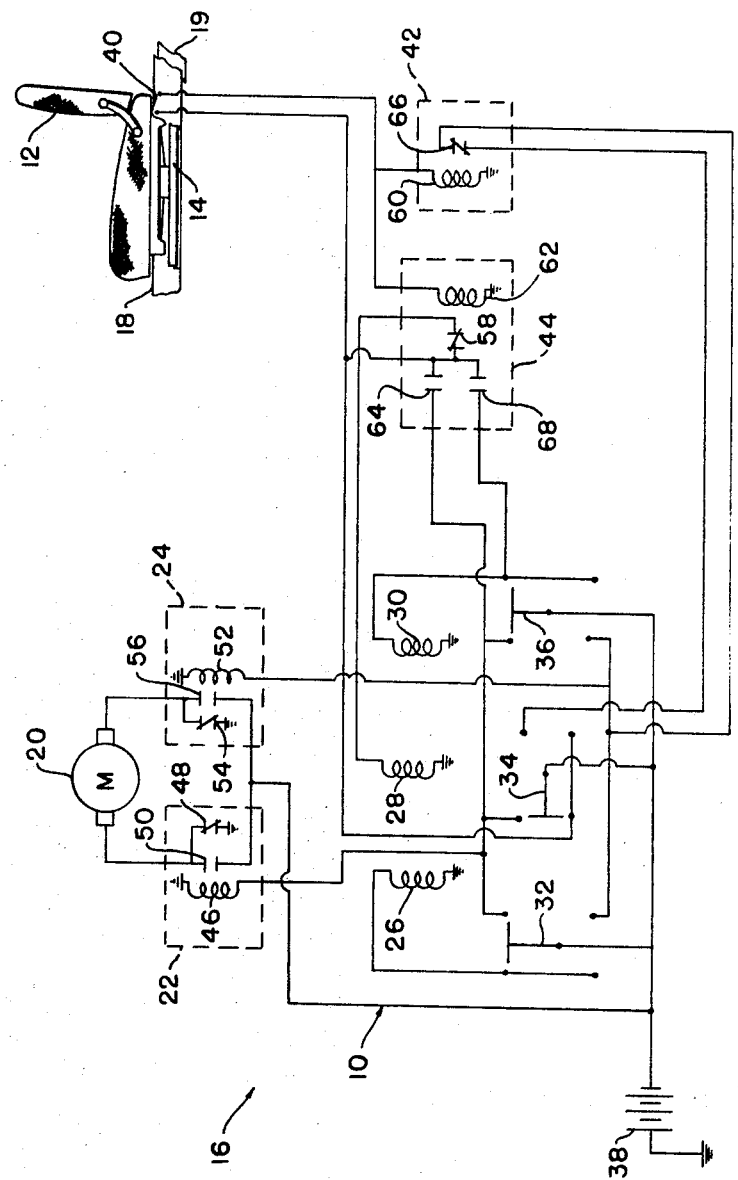
INVENTOR.
JOSEPH C. LITTMANN
BY *Whittemore,*
*Hulbert & Belknap*
ATTORNEYS

United States Patent Office 3,471,765
Patented Oct. 7, 1969

3,471,765
SEAT ADJUSTER CIRCUIT CONTROL
Joseph C. Littmann, Grosse Pointe Woods, Mich., assignor to Ferro Manufacturing Corporation, a corporation of Michigan
Filed Feb. 15, 1965, Ser. No. 432,685
Int. Cl. H02p 1/22, 1/40, 3/20
U.S. Cl. 318—286          10 Claims

ABSTRACT OF THE DISCLOSURE

Seat adjuster mechanism for moving a seat in a plurality of different directions separately and a control circuit therefor. The control circuit includes means for producing movement of the seat in a direction to move the seat off an obstacle on which it rests before producing movement in at least one of the separate directions. The circuit further includes an electric motor for producing movement of the seat and means operable to selectively connect a source of electrical energy to the motor for producing dynamic braking of the motor to prevent undesirable coasting of a seat past an adjusted position.

---

The trend in automobile design in recent years has been toward lower silhouettes. An effort has been made to provide the lower silhouettes for automobiles with a minimum of reduction in occupant space within the vehicles. Thus, the tunnel surrounding the drive shaft has projected more and more into the occupant compartment of the automobile and the seat structure has been lowered more and more so that in some present automobiles with the seat in a fully lowered position a portion of the seat usually the rear thereof rests on the floor covering over the tunnel.

It is undesirable to move the seat forward or backward with the seat resting on the floor covering. If the seat is moved forward and backward under such conditions, without first raising the seat out of engagement with the floor covering, scuffing or bunching of the floor covering results.

It is therefore an object of the present invention to provide an improved electric circuit for operation of seat adjuster mechanical structure.

Another object is to provide an electric circuit for actuation of the mechanical structure of seat adjuster mechanism including means for preventing movement of the seat in horizontal directions with the seat resting on an obstruction such as a floor covering.

Another object is to provide an electric circuit for actuating the mechanical structure of seat adjuster mechanism including means for first raising the rear of the seat out of engagement with floor covering before horizontal movement of the seat is initiated if horizontal movement of the seat is desired when the rear of the seat is in engagement with the floor covering.

Another object is to provide an electric circuit for actuating the mechanical portion of a seat adjuster which is simple in construction, economical to manufacture and efficient in use.

Other objects and features of the invention will become apparent as the description proceeds, especially when taken in conjunction with the accompanying drawings, illustrating a preferred embodiment of the invention, wherein:

The figure is a schematic diagram of an electric circuit for actuation of the mechanical structure of seat adjuster mechanism constructed in accordance with the invention.

With particular reference to the figure of the drawing, one embodiment of the present invention will now be considered in detail.

As shown in the figure, the electric circuit 10 is provided in conjunction with a vehicle seat 12 mounted on the mechanical structure 14 of seat adjuster mechanism 16. The rear of seat 12 engages the floor covering 18 over the automobile drive shaft tunnel 19 with the seat 12 in a down position. In operation the seat 12 may be adjusted up and down in the front, back and forth horizontally and up and down in the rear separately. In accordance with the invention, when the seat 12 is in a position where it rests on the floor covering 18 at the rear thereof, the rear of the seat is automatically raised out of engagement with the floor covering 18 before the seat is moved horizontally through the usual means for moving the seat horizontally.

The mechanical structure 14 of the seat adjuster mechanism 16 may be for example the mechanical seat adjuster structure illustrated in commonly owned patent application, Ser. No. 401,482, now abandoned, filed Oct. 5, 1964. Such structure requires the simultaneous energizing of a reversible motor and one solenoid to move the seat in any of the directions up or down in front, forward or backward horizontally and up or down in the rear. The motor of course must be rotated in the proper direction for the movement desired. Since such structures are not uncommon the mechanical structure of the seat adjuster 16 illustrated in the figure will not therefore be considered in further detail.

More specifically the electric circuit 10 for actuating the mechanical structure 14 of the seat adjuster mechanism 16 includes the reversible motor 20 which may be actuated in opposite directions on alternative energizing of the relays 22 and 24. The solenoids 26, 28 and 30 must be energized along with the motor 20 to respectively provide movement of the seat up or down in the front, forward or backward horizontally and up or down in the back in conjunction with the mechanical structure 14 of the seat adjuster mechanism 16.

Switches 32, 34 and 36 are provided to connect the battery 38 to the motor 20 and solenoids 26, 28 and 30 so as to provide a desired movement of the seat 12. Thus, with switch 32 in an up position upward movement of the front of seat 12 will result, while with switch 32 in a down position downward movement of the front of seat 12 will be accomplished. Similarly with switch 36 in an up position the rear of the seat 12 will be moved up, while with the switch 36 in a down position the rear of the seat 12 will be moved in a down direction. Under the conditions where the seat 12 is not resting on the floor covering 18, the switch 34 in a left or forward position will produce movement of the seat 12 forward horizontally. In a right or backward position switch 34 will cause the motor 20 and the solenoid 28 to be energized to move the seat in a backward direction.

In accordance with the invention if the seat 12 is lowered to a position where the rear thereof is resting on the floor covering 18 over the tunnel 19, when the switch 34 is closed so as to normally move the seat 12 in a forward or backward direction, the limit switch 40 will be closed thereby so that the relays 42 and 44 will be energized. With the relays 42 and 44 energized the relay 22 and the solenoid 30 are energized on closing of the switch 34 in either direction to first automatically raise the rear of the seat 12 out of engagement with the floor covering 18, after which the limit switch 40 opens and the solenoid 28 and motor 20 are energized to move the seat forward or backward as desired in accordance with the closing of the switch 34.

Thus in over-all operation of the electric circuit 10 of the seat adjuster mechanism 16, when it is desired to raise the front of the seat 12, the switch 32 is moved into an up position to connect the battery 38 to the solenoid 26 and to simultaneously energize the relay coil 46 which causes the normally closed relay contact 48 to open and the normally open relay contact 50 to close. The motor 20 is thus connected to the battery 38 through the relay contact 50 and the normally closed contact 52 of relay 24. The motor 20 will thus rotate in a direction necessary to move the front of the seat 12 in an up direction since the mechanical structure of seat adjuster mechanism 14 is connected to the motor 20 on energizing the solenoid 26 through appropriate clutch structure actuated by solenoid 26.

To move the front of the seat 12 down the switch 32 is closed in a down direction to again energize the solenoid 26 from the battery 38 and to simultaneously energize coil 52 of the relay 24 whereby the normally closed contact 54 is opened and the normally open contact 56 is closed. The motor 20 is thus energized in an opposite direction by the battery 38 through the now closed contact 56 and the normally closed contact 48 of relay 22.

Similarly, when it is desired to raise the rear of the seat 12, the switch 36 is placed in the up position wherein the solenoid 30 is energized from battery 38 and the relay 22 is energized to drive the motor in a direction to cause upward movement of the rear of the seat 12. On movement of the switch 36 in a down direction the solenoid 30 is again energized to engage appropriate clutch mechanism along with the relay 24 to energize the motor in the opposite direction causing downward movement of the rear of seat 12.

When it is desired to move the seat 12 forward if the rear of the seat is not resting on the floor covering 18 when the switch 34 is placed in a forward position the solenoid 28 is energized from battery 38 through the normally closed contact 58 of relay 44 to actuate appropriate clutch mechanism and the relay 22 is energized to drive the motor 20 in the required direction. To move the seat 12 backward under the same conditions the switch 34 in a backward position connects the solenoid 28 and the relay 24 to the battery 38.

However, when the seat 12 is in a down position so that the rear of the seat 12 engages the floor covering 18 the limit switch 40 is closed so that the relay coils 60 and 62 of relays 42 and 44 are energized by battery 38 through switch 34 when switch 34 is closed in either the forward or backward direction. With the seat so positioned, on movement of the switch 34 into a forward position the solenoid 28 associated with forward and backward movement of the seat 12 is no longer energized due to the now open, normally closed relay contact 58 of relay 44. The relay 22 is still energized however since the motor direction associated with up movement of the rear of the seat 12 is the same as that associated with forward movement of the seat 12. In addition the solenoid 30 associated with movement of the rear of the seat 12 in either an up or down direction is energized through the now closed, normally open contact 64 of relay 44. The seat 12 will thus move up in the rear until the floor covering 18 is cleared by the rear of the seat 12 at which time the limit switch 40 will open, deenergizing relays 42 and 44 so that with the switch 34 still in the forward position, the seat will be moved forward by the normal energizing of the relay 22 and solenoid 28.

When it is desired to move the seat backward with the seat in a down position so that the rear thereof closes the limit switch 40 and the relays 42 and 44 are energized through switch 34, similar automatic raising of the rear of the seat 12 before backward movement of the seat 12 occurs. Thus initially the energizing of the relay 24 normally accomplished through the normally closed contact 66 of relay 42 will not occur due to energizing of the relay 42 and the solenoid 28 will not be energized due to opening of the contact 58. Instead the relay 24 will be energized through the now closed, normally open contact 64 of relay 44 and the solenoid 30 associated with movement of the back of the seat 12 will be energized through the normally open, but now closed contact 68 of relay 44. Again, after the rear of the seat 12 has been raised out of contact with the floor covering 18, the normal rearward movement of the seat 12 considered above will be accomplished since the relays 42 and 44 will be deenergized.

Thus, it will be seen that there is provided a simple, efficient electric circuit for controlling the actuation of the mechanical structure of seat adjuster mechanism so that the rear of a seat supported thereby will be raised automatically a distance to cause the seat to clear floorcovering 18 on which it rests at any time the rear of the seat is resting on the floor covering when forward or backward movement of the seat is called for, after which the usual forward or backward movement of the seat will be accomplished. While initial automatic raising of the rear of the seat 12 is indicated, it will be apparent from the disclosure to those skilled in the art that similar initial movement of the front of the seat or both the front and rear of the seat may be accomplished within the scope of the invention.

While one embodiment and modifications of the present invention have been considered in detail, it will be understood that other embodiments and modifications thereof are contemplated. It is therefore the intention to include all embodiments and modifications as are defined by the appended claims within the scope of the invention.

What I claim as my invention is:

1. Seat adjuster mechanism, including mechanical structure for moving the seat in two directions separately, an electric circuit connected to the mechanical structure for controlling the actuation of the mechanical structure to produce the separate seat movements, including a motor operable to produce the two movements, a source of electrical energy for energizing the motor and means positioned between the source of electrical energy and electric motor for connecting the motor to move the seat in the two directions directly when the seat is not in engagement with an obstacle to movement in one direction, and switch means connected between the motor and source of electrical energy, engageable with the obstruction and operable on engagement therewith to alter the electric circuit and first produce movement of the seat in the other of the two directions when movement of the seat in the one direction is impeded by the obstacle before movement of the seat in the one direction.

2. Structure as set forth in claim 1, wherein the one direction is horizontal and the other direction is vertical and the means positioned between the source of energy and motor for connecting the motor to move the seat includes separate solenoids associated with each direction and switches actuable by the solenoids for connecting the source of electrical energy to the motor to produce the desired movement.

3. Structure as set forth in claim 2, wherein the means for first producing movement of the seat in the other direction comprises a limit switch, the solenoid associated with the vertical direction and means for first energizing the solenoid associated with the vertical direction on sensing of an obstacle in the path of forward and backward movement of the vehicle seat with the limit switch.

4. Seat adjuster mechanism including mechanical structure for moving the seat up and down in the front and rear separately and for moving the seat horizontally, an electric circuit connected to the mechanical structure for controlling the actuation of the mechanical structure to produce the separate seat movements including a reversible motor operable in opposite directions to produce either upward movement of the front and rear of the seat and forward movement of the seat or downward movement of the front and rear of the seat and backward movement thereof and separate solenoids associated with up and down movement of the front of the seat, up and down movement of the rear of the seat, and forward and backward movement of the seat on being energized along with energization of the motor, a source of electric energy and switches connected between the source of electric energy and the motor and solenoids for energizing the motor and solenoids to produce the desired movement of the seat directly with the rear of the seat out of engagement with an obstruction in the path of movement thereof, a limit switch closed when the rear of the seat is in contact with the obstruction and circuit means connected to the limit switch for first energizing the solenoid corresponding to vertical movement of the rear of the seat and the motor in a direction to cause upward movement of the rear of the seat on closing of the switch associated with forward and backward movement of the seat with the limit switch closed before the solenoid associated with forward and backward movement of the seat is energized.

5. Structure as set forth in claim 4 wherein the circuit means for first energizing the solenoid corresponding to vertical movement of the rear of the seat and the motor in a direction to cause upward movement of the rear of the seat with the limit switch closed includes a relay, means for energizing the relay on the limit switch being closed and relay contacts operably associated with the motor to prevent energizing of the motor in a direction to drive the mechanical structure of the seat adjuster mechanism in a direction to produce backward movement of the seat with the relay energized.

6. Structure as set forth in claim 4 wherein the circuit means for first energizing the solenoid corresponding to vertical movement of the rear of the seat and the motor in a direction to cause upward movement of the rear of the seat with the limit switch closed includes a relay, means for energizing the relay on the limit switch being closed and relay contacts operably associated with the solenoid associated with forward and backward movement of the seat to prevent energizing of the solenoid associated with forward and backward movement of the seat with the relay energized.

7. Structure as set forth in claim 6 wherein the relay further includes contacts operably associated with solenoid associated with upward and downward movement of the rear of the seat and the motor to energize the solenoid associated with upward and downward movement of the rear of the seat and to energize the motor in a direction to produce upward movement of the seat.

8. An electric circuit for actuating the mechanical structure of seat adjuster mechanism to produce separate movement up and down of the front and back of a seat and movement forward and backward of the seat comprising a source of electric energy, a reversible motor for driving the seat, three separate clutch solenoids for connecting the motor to the mechanical structure associated respectively with up and down movement of the front of the seat, up and down movement of the rear of the seat and horizontal movement of the seat, separate switch means connected to the source of electrical energy, each having two positions, the first of which is operable in one position to connect the clutch solenoid associated with up and down movement of the front of the seat to the source of electric energy and to connect the motor for rotation in a direction to drive the front of the seat in an up direction and is operable in the other position thereof to connect the clutch solenoid associated with up and down movement of the front of the seat to the source of electric energy and to connect the motor for rotation in a direction to produce rotation in a direction to drive the front of the seat in a down direction, the second of said separate switches being operable in the two positions thereof to connect the clutch solenoid associated with up and down movement of the rear of the seat and the motor to the source of electric energy to produce up and down movement of the rear of the seat, a limit switch closed when the rear of the seat is in a fully down position and in engagement with an obstruction and open when the seat is out of engagement with the obstruction, the third of said separate switches being operable when the limit switch is open in the two positions thereof to connect the clutch solenoid associated with forward and backward movement of the seat and the motor to the source of electric energy to cause movement of the seat in a forward or backward direction, and means for first energizing the clutch solenoid associated with upward movement of the rear of the seat and the motor in a direction to cause upward movement of the rear of the seat on closing of the separate switch associated with forward and backward movement of the seat with the limit switch closed and for thereafter energizing the clutch solenoid associated with forward and backward movement of the seat and the motor in a direction in accordance with the desired direction of movement of the seat forward or backward.

9. Structure as set forth in claim 8 wherein the means for first energizing the clutch solenoid associated with upward movement of the rear of the seat and the motor in a direction to cause upward movement of the rear of the seat includes a first relay including a normally closed contact energized with the limit switch closed operable to prevent energizing of the motor in a direction to move the seat in a backward direction on closing of the switch associated with movement of the switch in a backward direction.

10. Structure as set forth in claim 9 wherein the means for first energizing the clutch solenoid associated with upward movement of the rear of the seat in an up direction and the motor in a direction to cause upward movement of the rear of the seat further includes a second relay, means for energizing the second relay with the limit switch closed, a contact through which the solenoid associated with forward and backward movement of the seat is energized with the limit switch open and a pair of contacts connected to energize the clutch solenoid associated with up and down movement of the rear of the seat and to energize the motor to produce upward movement of the rear of the seat with the limit switch closed.

References Cited
UNITED STATES PATENTS

| | | | |
|---|---|---|---|
| 2,575,021 | 11/1951 | Leitch et al. | 318—379 XR |
| 2,924,265 | 2/1960 | Himka | 297—330 |
| 3,072,231 | 1/1963 | Iding. | |
| 3,220,762 | 11/1965 | Garvey et al. | 248—419 XR |

ORIS L. RADER, Primary Examiner

R. J. HICKEY, Assistant Examiner

U.S. Cl. X.R.
192—2; 248—419